United States Patent [19]

Moran

[11] 4,082,951
[45] Apr. 4, 1978

[54] COMPTON EFFECT THERMALLY ACTIVATED DEPOLARIZATION DOSIMETER

[75] Inventor: Paul R. Moran, Madison, Wis.

[73] Assignee: The United States of America as represented by the United States Department of Energy, Washington, D.C.

[21] Appl. No.: 598,276

[22] Filed: Jul. 23, 1975

[51] Int. Cl.² .............................................. G01T 1/00
[52] U.S. Cl. .................................. 250/336; 250/337; 250/395
[58] Field of Search ............... 250/336, 337, 395, 472, 250/473, 484

[56] References Cited

U.S. PATENT DOCUMENTS

| 3,450,879 | 6/1969 | Seppi ..................................... 250/336 |
| 4,016,422 | 4/1977 | Moran et al. ........................ 250/336 |

*Primary Examiner*—Davis L. Willis
*Attorney, Agent, or Firm*—Dean E. Carlson; Frank H. Jackson; Robert J. Fisher

[57] ABSTRACT

A dosimetry technique for high-energy gamma radiation or X-radiation employs the Compton effect in conjunction with radiation-induced thermally activated depolarization phenomena. A dielectric material is disposed between two electrodes which are electrically short circuited to produce a dosimeter which is then exposed to the gamma or X radiation. The gamma or X-radiation impinging on the dosimeter interacts with the dielectric material directly or with the metal composing the electrode to produce Compton electrons which are emitted preferentially in the direction in which the radiation was traveling. A portion of these electrons becomes trapped in the dielectric material, consequently inducing a stable electrical polarization in the dielectric material. Subsequent heating of the exposed dosimeter to the point of onset of ionic conductivity with the electrodes still shorted through an ammeter causes the dielectric material to depolarize, and the depolarization signal so emitted can be measured and is proportional to the dose of radiation received by the dosimeter.

10 Claims, 1 Drawing Figure

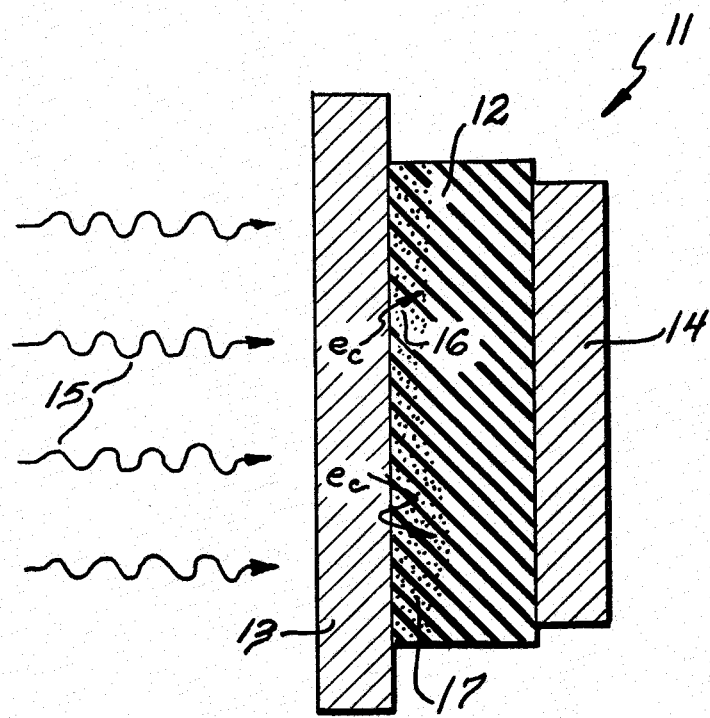

COMPTON EFFECT THERMALLY ACTIVATED DEPOLARIZATION DOSIMETER

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates generally to radiation dosimetry techniques and is concerned particularly with dosimetry of gamma-radiation or X-radiation. More particularly, the invention relates to dosimetry techniques for high-energy gamma or X-radiation at high doses and particularly at doses in excess of 1 rad. More specifically, the present invention is directed toward a dosimetry technique which employs the radiation-induced thermally activated polarization/radiation-induced thermally activated depolarization (RITAP/RITAD) phenomenon which occurs in dielectric materials.

Radiation-induced thermally-activated polarization/depolarization is a relatively recently discovered radiation-induced phenomenon occurring in dielectric materials which has found useful application in radiation dosimetry techniques. The phenomenon was discovered in studies directed toward thermoluminescent dosimetry and thermally stimulated currents and, while somewhat related to these other phenomena, has been found actually to be a different and independent phenomenon in itself.

The RITAD phenomenon has been reported in a paper coauthored by the present inventor which appeared in Physical Review Letters, Vol. 29, No. 11, Sept. 11, 1972. The particular RITAD phenomenon disclosed in this paper has come to be known as the external RITAD effect. In accordance with this effect and as reported in the above-mentioned paper, a stable electrical polarization is effected in the dielectric material when the RITAD dosimeter is exposed to radiation in the presence of an externally applied electric field. This polarization is proportional to the radiation dose absorbed by the dosimeter and can be subsequently read out as a function of depolarization current versus temperature as the dosimeter is gradually heated through an appropriate temperature range. The heating of the dosimeter raises the energy level of the dielectric material to the point of onset of ionic conductivity, at which point the radiation-induced polarization in the dielectric material becomes unstable and a depolarization current is generated. In accordance with this external RITAD technique, the dosimeter, which includes a dielectric material disposed between polarizing electrodes, is preliminarily annealed to remove any stored energy which may be present in the dielectric material and the polarizing electrodes are grounded during cooling. A high external electric field is established across the two polarizing electrodes of the dosimeter during the exposure to radiation, consequently giving the name external RITAD, and subsequent to the exposure the polarizing electrodes are shorted through an ammeter during the readout. During the readout, the stable electrical polarization induced in the dielectric material by the radiation becomes unstable and generates a thermally activated depolarization current as the dosimeter is heated through a characteristic temperature range and the radiation dose is determined by measuring or plotting the depolarization current versus the temperature.

Subsequent to the discovery of the above external RITAD effect, a new and different RITAP/RITAD effect was discovered and reported in a paper coauthored by the present inventor, which paper appeared in Science, Vol. 179, pages 380-382, Jan. 26, 1973. This effect, which has come to be known as the local RITAD effect, differed from the external RITAD effect in that no external electrical field was applied to the dosimeter during either radiation exposure or readout. Rather it was found that a high-temperature bias-polarization procedure produced an electric field within the material itself which produced a RITAD effect. In accordance with this technique, the polarizing electrodes of the dosimeter are tied in to an electrical circuit during annealing of the dosimeter. In this way, a high-temperature bias-polarization is induced in the dosimeter dielectric material prior to the exposure to the radiation. A high voltage is established across the electrodes of the dosimeter as the dosimeter is heated to a high temperature, and the voltage is maintained across the electrodes while the dosimeter is cooled. The bias-poling voltage is removed after cooling and the dosimeter electrodes are shorted and grounded during exposure to the radiation and grounded through an ammeter during readout. As a result of the bias-polarization pretreatment, the sample retains a very strong electret polarization, which stable bias-polarization state produces local electric fields in the sample which give rise to the RITAD effect after irradiation, consequently giving the name local RITAD effect. During the subsequent readout following radiation exposure, the dose of radiation received by the dosimeter is again measured as a function of depolarization current versus temperature as the dosimeter is gradually heated through a characteristic temperature range. As the dosimeter reaches a sufficient temperature, it reaches the point of onset of ionic conductivity and depolarization of the established radiation-induced polarization occurs, giving the current readout. The depolarization current generated is proportional to the dose of radiation absorbed.

A better understanding of this phenomenon can be obtained from the more complete discussion of the subject contained in the two above-identified reports and the report "Radiation and Impurity Induced Thermally Activated Charge Transport in Calcium Fluoride" by Ervin B. Podgorsak and P. R. Moran available as USAEC Technical Report COO-1105-184, which three reports are expressly incorporated herein by reference as though fully set forth.

The subject matter of these reports and particularly the material appearing in the Physical Review Letters article and the Science article has served as the basis for and has been embodied in a previously copending U.S. patent application which has now issued as U.S. Pat. No. 4,016,422. The disclosure of U.S. Pat. No. 4,016,422 embodying and including the subject matter and material in the referenced reports is likewise expressly incorporated herein by reference as though fully set forth.

Both of these techniques have proven operable and have good potential for application to various radiation dosimetry problems. Both the external RITAD and local RITAD techniques are specific examples of the more general radiation-induced polarization in materials, RITAP/RITAD, which general phenomenon may provide other techniques and applications. One such additional technique and application is the subject of the present invention.

It is an object of the present invention to provide a dosimetry technique for high-energy gamma-radiation or X-radiation.

It is a further object of the present invention to provide a dosimetry technique for high dose levels and particularly for dose levels above the 1 rad level.

Another object of the present invention is to provide a dosimetry technique which provides a technique for using a wide variety of dosimeter materials which permits matching of the dosimeter materials with other materials being irradiated.

Other objects and advantages of the present invention will become apparent upon reading and consideration of the following description.

SUMMARY OF THE INVENTION

In accordance with the dosimetry technique of the present invention, the dose level of high-energy gamma-radiation or X-radiation can be determined by exposing a dosimeter which is composed of a dielectric material disposed between two electrodes, which electrodes are electrically short-circuited, to the gamma or X-radiation. Subsequent to the exposure, the dosimeter with the electrodes still short-circuited is heated to the point of onset of ionic conductivity, and the resulting current released by the heating is measured, this current being proportional to the dose of radiation received by the dosimeter.

The gamma or X-radiation impinging on the dosimeter interacts with the dosimeter material producing electrons by the Compton effect which Compton-effect electrons are preferentially emitted in the direction in which the radiation is traveling. A portion of these electrons becomes trapped in the dielectric material, consequently inducing a stable electrical polarization in the dielectric material due to the preferential direction of emission. Subsequent heating of the dosimeter to the point of onset of ionic conductivity causes the depolarization of the dielectric material, and the resulting depolarization current generated is measured to give a reading of the dose received by the dosimeter. This depolarization signal is most easily measured as a function of depolarization current versus temperature as the dosimeter is gradually heated through a characteristic temperature range. The integrated depolarization current produced is proportional to the dose of radiation received by the dosimeter.

BRIEF DESCRIPTION OF THE DRAWING

A fuller understanding and appreciation of the present invention as well as specific features of the invention will be obtained upon reading the following detailed description of the invention and with reference to the drawing which illustrates a RITAP/RITAD dosimeter comprising a dielectric material disposed between two electrodes and exposed to impinging radiation.

DETAILED DESCRIPTION OF THE INVENTION

In measuring the radiation dose of high-energy gamma or X-radiation in accordance with the dosimetry technique of the present invention, a RITAP/RITAD dosimeter is employed, the RITAP/RITAD dosimeter comprising a dielectric material disposed between two electrodes which generally are metallic. While for some RITAP/RITAD dosimetry techniques, only certain dielectric materials such as lithium fluoride, calcium fluoride, etc., are employed as they have been found to function better than others, in the practice of the present invention it has been found that essentially any dielectric material will function, although the alkali halides are preferred. Examples of materials which can be used in the practice of the present invention include $LiF$, $CaF_2$, $MgF_2$, $SrF_2$, polymethylpentene, and $Al_2O_3$ in ceramic or sapphire form. This wide range of materials from which the dielectric material can be chosen offers distinct advantages which will be discussed below.

While the thickness of the dielectric material in the dosimeter is not a crucial consideration and any thickness of material will function properly, it has been found that the polarization effect induced in the dielectric material builds up in a short distance from the surface of the solid. Consequently, thin-film dosimeters are possible and perhaps are preferred.

Whether a thin film of dielectric material or a thicker sample is employed, electrodes are disposed on the opposite faces of the dielectric material. One electrode could be referred to as the back electrode, while the other electrode, which would be exposed to the impinging radiation or on the side of the dielectric material exposed to the impingng radiation, could be referred to as the front electrode. It is not necessary that either the front electrode or the back electrode completely cover the surfaces of the dielectric material, but rather in one embodiment of the invention the front electrode covers only a small portion of the front surface of the dielectric material and the dielectric material itself is bombarded with the gamma or X-radiation to produce the polarization in the dielectric material.

In accordance with standard procedures in RITAP/RITAD dosimetry, the dosimeter is annealed prior to exposure to the radiation. The heating to a high temperature serves to drive out any stored polarization or energy which may be present in the dielectric material. Consequently, any potential interfering peaks which may have caused interference during readout will be removed by the annealing of the dosimeter prior to exposure to irradiation, and the peaks which appear during readout are attributable to the exposure to the radiation.

In the practice of the present invention the dosimeter is maintained at a zero electrical potential during exposure to the gamma or X-radiation which is accomplished by not applying any sort of external electric field during the irradiation and by short-circuiting the two electrodes of the dosimeter. The dosimeter is exposed to the radiation with the two electrodes of the dosimeter short-circuited. The gamma or X-radiation impinges on the dosimeter and interacts with the material forming the front or radiation-receiving surface. Electrons are produced by the Compton effect in the material bombarded by the radiation and the Compton electrons so produced are emitted preferentially in the same direction in which the radiation was traveling when striking the dosimeter. As these Compton electrons pass into the dosimeter dielectric material, a portion of the Compton electrons becomes trapped and consequently induces an electrical polarization. The electrical polarization results from the trapping of electrons emitted preferentially in one direction.

In one embodiment of the present invention, the front or radiation-receiving electrode of the dosimeter can be made of a metal chosen of a suitable atomic number such as to serve as a Compton electron radiator. Such a metal is one which has a high tendency to produce electrons by the Compton effect when subjected to gamma or X-radiation. In such a case, the front electrode or radiation-receiving electrode could be referred to as a Compton radiator. The Compton electrons emitted by the Compton radiator become trapped in the dielectric material, producing the electrical polarization in the same manner as described above, developing a direct radiation-produced Compton effect solid-state polarization in the dosimeter.

The process of the present invention can be more clearly appreciated by referring to the drawing which illustrates a RITAP/RITAD dosimeter, indicated generally at 11, which can be seen to include a dielectric material 12 and electrodes 13 and 14 disposed on the opposite faces of the dielectric material 12. The electrode 13 which in the practice of the present dosimetry technique is exposed to impinging gamma or X-radiation, indicated as 15, can be referred to as the front electrode while the other electrode 14 is referred to as the back electrode. The gamma or X-radiation 15 impinges on the radiation-receiving front electrode 13 and interacts with the material forming the electrode to produce electrons by the Compton effect. The Compton electrons, exemplified in the drawing by the symbol $e_c$, are emitted preferentially in the same direction as that in which the impinging radiation was traveling when striking the dosimeter 11, and hence pass into the dielectric material 12 as indicated by the arrows 16. The Compton electrons $e_c$ become trapped in the dielectric material 12 and induce an electrical polarization, which polarization effect builds up in a layer a short distance from the surface as is indicated by the dotted portion 17 of the dielectric material 12.

Following exposure to the radiation, the dosimeter can be stored for a period of time without losing its polarization, as it is a stable electrical polarization. At some time subsequent to the radiation exposure, the radiation dose received by the dosimeter can be determined by heating the dosimeter with the electrodes still short-circuited in accordance with standard local RITAD readout techniques. The dosimeter is heated slowly, preferably at a constant rate, through a characteristic temperature range and up to and beyond the point at which all the stored energy deposited by the radiation will be released. As the dosimeter is heated to the point of onset of ionic conductivity, the dielectric material will depolarize, that is, the stable electrical polarization induced at the lower temperature by the radiation will become unstable as a result of the higher temperature onset of ionic conductivity generating a depolarization current. In RITAP/RITAD effects, any kind of solid-state polarization produced stably at some temperature will always be depolarized at some higher temperature. When the material in question has electrodes attached, the depolarization can be sensed as an electrical charge flow between the electrodes. In the technique of the present invention, the electrodes are short-circuited during the heating through an ammeter and the depolarization signal emitted during the heating is read as the current flowing through the ammeter. This signal can be measured to determine the dose of radiation received by the dosimeter. The depolarization signal preferably is measured as current versus temperature as the dosimeter is gradually heated. By plotting on a graph the two variables, current and temperature, a plot will be obtained which has a series of peaks at or around certain characteristic temperatures, these peaks being points at which a depolarization current is generated in the material. The integrated current is proportional to the dose of radiation received by the dosimeter.

While it has been found that this Compton effect dosimetry technique is not quite as sensitive as the local RITAD technique, the Compton effect RITAD signal has many useful and potentially important features for certain applications. In fact, at radiation doses at and above the 1 rad level, the present technique may prove to be very useful, since above the 1 rad level the technique becomes quite sensitive. Examples of potential applications are electron beam pulse studies for high-powered lasers, use in burst reactors, dosimetry studies of weapons effects, pulse plasma fusion sources, etc. In addition, another application where the present invention actually offers advantages over other types of dosimetry is that all electronic and mechanical-electro devices in the region of the above-mentioned radiation sources and other locations which will be exposed to high levels of radiation will require dosimetry studies on simulated device configurations to predict radiation degradation of the devices and the materials from which the apparatus is made. Since the present invention permits use of almost any dielectric material, the dielectric material used can be one with an average atomic number chosen so as to approximately match the atomic number of the materials in the device. Consequently, a good approximation as to the dose actually absorbed by the material can be obtained. In addition, mixed composition dosimeters are possible with the present technique.

The present technique also offers an advantage over the local RITAD and external RITAD techniques in that ionic conductivity does not limit the dosimeter usefulness. This contrasts sharply with the more sensitive but background-conduction-limited RITAD/RITAP type dosimeters. Consequently, the present dosimetry technique offers a new and different and sometimes advantageous dosimetry technique and offers several features important for certain special dosimetry applications.

The embodiments of the invention in which an exclusive property or privilege is claimed are defined as follows:

1. A Compton effect dosimetry method for high-energy gamma and X-radiation comprising:
 a. forming a Compton effect dosimeter by placing a thin film of a dielectric material between a back electrode and a radiation-receiving electrode composed of a metal of such an atomic number so as to serve as a Compton-electron radiator;
 b. short-circuiting the two electrodes of the dosimeter;
 c. annealing the short-circuited dosimeter;
 d. exposing the short-circuited dosimeter to the radiation so that the radiation impinges on the radiation-receiving electrode, whereby the gamma or X-radiation interacts with the metal, electrons are produced by the Compton effect, the Compton effect electrons are emitted preferentially in the direction in which the radiation is traveling, a portion of the Compton effect electrons becomes trapped in the dielectric material, and consequently an electrical polarization is induced in the dielectric material;

e. subsequently heating the short-circuited dosimeter to the point of onset of ionic conductivity, whereby the dielectric material depolarizes;
f. measuring the depolarization signal emitted as current versus temperature as the dosimeter is gradually heated, whereby the integrated current is proportional to the dose of radiation received by the dosimeter.

2. A gammma or X-radiation dosimetry method comprising:
a. forming a dosimeter comprising a dielectric material disposed between two electrodes and including a radiation-receiving surface which comprises a material which is a Compton electron radiator;
b. electrically short-circuiting said two electrodes;
c. exposing said short-circuited dosimeter to said gamma or X-radiation, whereby the radiation interacts with the Compton electron radiator material, electrons are produced by the Compton effect, the electrons so produced are emitted preferentially in the direction in which the radiation is traveling, a portion of these electrons becomes trapped in the dielectric material, and consequently induces an electrical polarization in the dielectric material;
d. subsequently heating the short-circuited dosimeter to the point of onset of ionic conductivity, whereby the dielectric material depolarizes; and
e. measuring the depolarization signal emitted.

3. The method of claim 2 wherein the depolarization signal is measured as current versus temperature as the dosimeter is gradually heated.

4. The method of claim 2 further comprising the step of annealing the dosimeter prior to exposing it to the radiation.

5. The method of claim 2 wherein the dosimeter is exposed to a dose in excess of 1 rad.

6. The method of claim 2 wherein said dielectric material is a thin film.

7. The method of claim 2 wherein the dielectric material is an alkali halide.

8. The method of claim 2 wherein the dielectric material is selected from the group consisting of $LiF$, $CaF_2$, $MgF_2$, $SrF_2$, $Al_2O_3$ and polymethylpentene.

9. The method of claim 2 wherein the dielectric material is placed between a radiation-receiving electrode and a back electrode.

10. The method of claim 9 wherein said radiation-receiving electrode is a metal of an atomic number chosen so as to be a Compton radiator.

* * * * *